(12) United States Patent
Kameyama et al.

(10) Patent No.: US 8,037,165 B2
(45) Date of Patent: Oct. 11, 2011

(54) INFORMATION PROCESSING APPARATUS AND PROCESS EXECUTION METHOD

(75) Inventors: Tadashi Kameyama, Inagi (JP); Masaki Fukushima, Kawasaki (JP); Yoshihito Yamagami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 12/230,259

(22) Filed: Aug. 26, 2008

(65) Prior Publication Data

US 2009/0022244 A1 Jan. 22, 2009

Related U.S. Application Data

(63) Continuation of application No. PCT/JP2006/303634, filed on Feb. 27, 2006.

(51) Int. Cl.
*G06F 15/173* (2006.01)

(52) U.S. Cl. ...................................................... 709/223

(58) Field of Classification Search ................... 709/223
See application file for complete search history.

(56) References Cited

U.S. PATENT DOCUMENTS

| 6,721,883 | B1* | 4/2004 | Khatri et al. | 713/2 |
| 2006/0179294 | A1* | 8/2006 | Chu et al. | 713/2 |
| 2009/0254776 | A1* | 10/2009 | Gonzalez et al. | 714/6 |

FOREIGN PATENT DOCUMENTS

| JP | 6-75613 | 3/1994 |
| JP | 6-187184 | 7/1994 |
| JP | 11-143507 | 5/1999 |

OTHER PUBLICATIONS

International Search Report for PCT/JP2006/303634, mailed May 30, 2006.

* cited by examiner

*Primary Examiner* — John Follansbee
*Assistant Examiner* — Alan Chou
(74) *Attorney, Agent, or Firm* — Staas & Halsey LLP

(57) ABSTRACT

An information processing apparatus is provided that executes a process sequence stored in a sequence table, based on a sequence code created for each process in the process sequence. The sequence code includes a process type that specifies a sequence table, a control target that specifies a control target, and a process number that specifies one particular process in the specified process sequence.

13 Claims, 14 Drawing Sheets

Fig.4

POWER-ON PROCESS SEQUENCE TABLE

| PROCESS NUMBER | EXECUTION PROCESS | CONTINUATION JUDGING PROCESS | FAULT PROCESS |
|---|---|---|---|
| 0 | SYSTEM BOARD POWER-ON PROCESS | SYSTEM BOARD POWER-ON COMPLETION CHECK | POWER-OFF PROCESS SEQUENCE (PROCESS NUMBER 2) |
| 1 | SYSTEM BOARD INITIALIZATION PROCESS A | SYSTEM BOARD INITIALIZATION COMPLETION CHECK | POWER-OFF PROCESS SEQUENCE (PROCESS NUMBER 1) |
| 2 | SYSTEM BOARD INITIALIZATION PROCESS B | SYSTEM BOARD INITIALIZATION COMPLETION CHECK | POWER-OFF PROCESS SEQUENCE (PROCESS NUMBER 1) |
| 3 | DOMAIN INITIALIZATION PROCESS C | DOMAIN INITIALIZATION COMPLETION CHECK | POWER-OFF PROCESS SEQUENCE (PROCESS NUMBER 0) |
| 4 | DOMAIN INITIALIZATION PROCESS D | DOMAIN INITIALIZATION COMPLETION CHECK | POWER-OFF PROCESS SEQUENCE (PROCESS NUMBER 0) |
| 5 | PROCESS TERMINATION | NONE | NONE |

Fig.5

RESET PROCESS SEQUENCE TABLE

| PROCESS NUMBER | EXECUTION PROCESS | CONTINUATION JUDGING PROCESS | FAULT PROCESS |
|---|---|---|---|
| 0 | DOMAIN STOPPING PROCESS | NONE | NONE |
| 1 | DOMAIN INITIALIZATION PROCESS E | DOMAIN INITIALIZATION COMPLETION CHECK | POWER-OFF PROCESS SEQUENCE (PROCESS NUMBER 0) |
| 2 | DOMAIN INITIALIZATION PROCESS F | DOMAIN INITIALIZATION COMPLETION CHECK | POWER-OFF PROCESS SEQUENCE (PROCESS NUMBER 0) |
| 3 | PROCESS TERMINATION | NONE | NONE |
| 4 | NONE | NONE | NONE |
| 5 | NONE | NONE | NONE |

Fig. 6

POWER-OFF PROCESS SEQUENCE TABLE

| PROCESS NUMBER | EXECUTION PROCESS | CONTINUATION JUDGING PROCESS | FAULT PROCESS |
|---|---|---|---|
| 0 | DOMAIN STOPPING PROCESS | NONE | NONE |
| 1 | SYSTEM BOARD STOPPING PROCESS | NONE | NONE |
| 2 | SYSTEM BOARD POWER-OFF PROCESS | NONE | NONE |
| 3 | PROCESS TERMINATION | NONE | NONE |
| 4 | NONE | NONE | NONE |
| 5 | NONE | NONE | NONE |

Fig.9

| No. | Sequence Code | | | | Sequence Control Program | | Hardware Control Program |
|---|---|---|---|---|---|---|---|
| | Process Type | Control Target | Process Number | Unique Number | | | |
| 1 | 1 | 2 | 0 | 35 | [INITIATE POWER-ON PROCESS SEQUENCE FOR DOMAIN #2] CREATE SEQUENCE CODE AND TRANSMIT DATA (POWER-ON 0) | → | |
| 2 | | | | | | ← | EXECUTE PROCESS AND RETURN RESPONSE (POWER-ON 0) |
| 3 | 1 | 2 | 1 | 35 | UPDATE SAME SEQUENCE CODE AS THAT INCLUDED IN RESPONSE (POWER-ON 0) AND TRANSMIT DATA (POWER-ON 1) | → | |
| 4 | | | | | | ← | EXECUTE PROCESS AND RETURN RESPONSE (POWER-ON 1) |
| 5 | 1 | 2 | 2 | 35 | UPDATE SAME SEQUENCE CODE AS THAT INCLUDED IN RESPONSE (POWER-ON 1) AND TRANSMIT DATA (POWER-ON 2) | → | |
| 6 | | | | | | ← | EXECUTE PROCESS AND RETURN RESPONSE (POWER-ON 2) |

Fig.10

| | | | | |
|---|---|---|---|---|
| 7 | 1 | 2 | 3 | 35 | UPDATE SAME SEQUENCE CODE AS THAT INCLUDED IN RESPONSE (POWER-ON 2) AND TRANSMIT DATA (POWER-ON 3) | |
| 8 | | | | | ↑↓ | EXECUTE PROCESS AND RETURN RESPONSE (POWER-ON 3) |
| 9 | 1 | 2 | 4 | 35 | UPDATE SAME SEQUENCE CODE AS THAT INCLUDED IN RESPONSE (POWER-ON 3) AND TRANSMIT DATA (POWER-ON 4) | |
| 10 | | | | | ↑↓ | EXECUTE PROCESS AND RETURN RESPONSE (POWER-ON 4) |
| 11 | 1 | 2 | 5 | 35 | UPDATE SAME SEQUENCE CODE AS THAT INCLUDED IN RESPONSE (POWER-ON 4) AND TERMINATE SEQUENCE | |

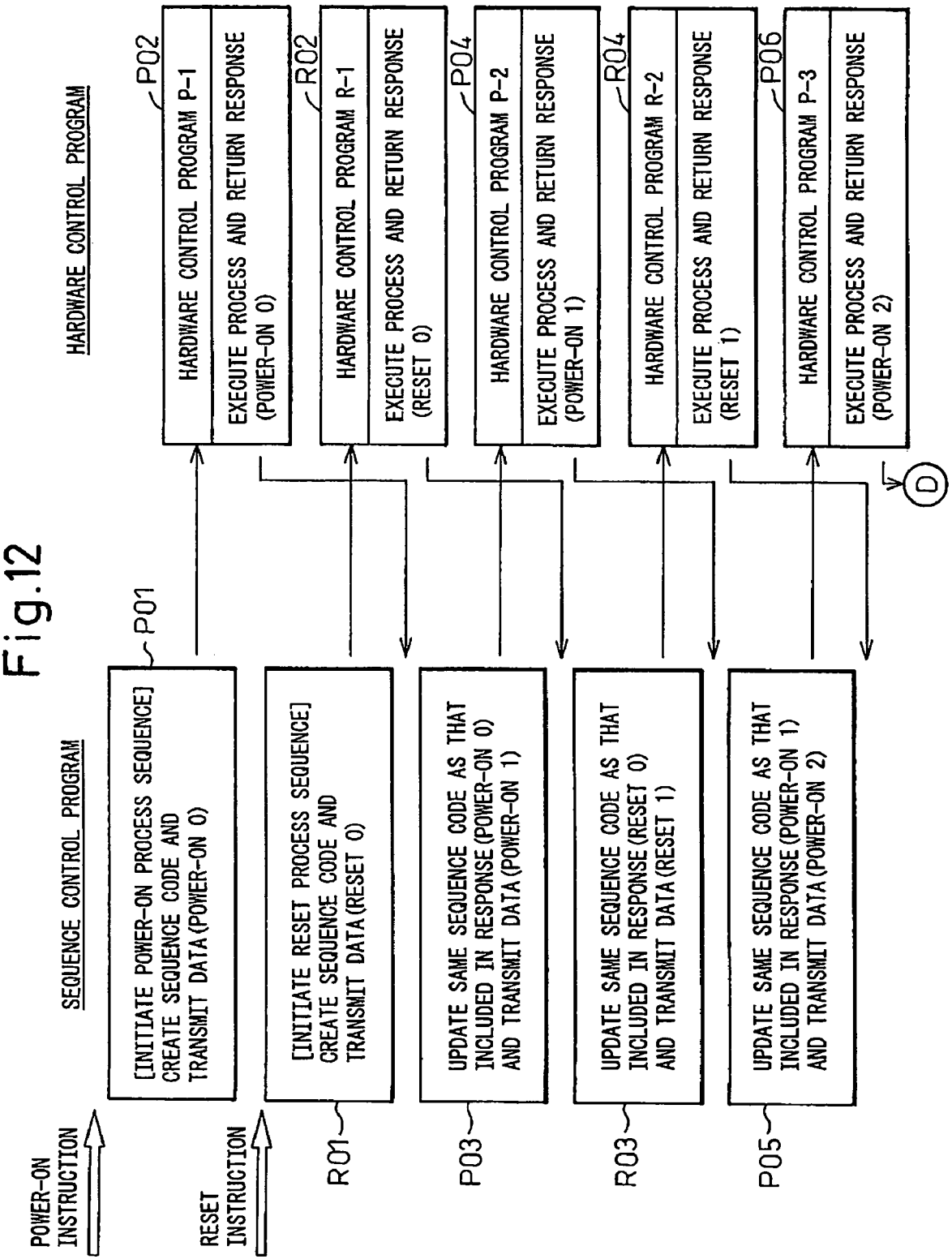

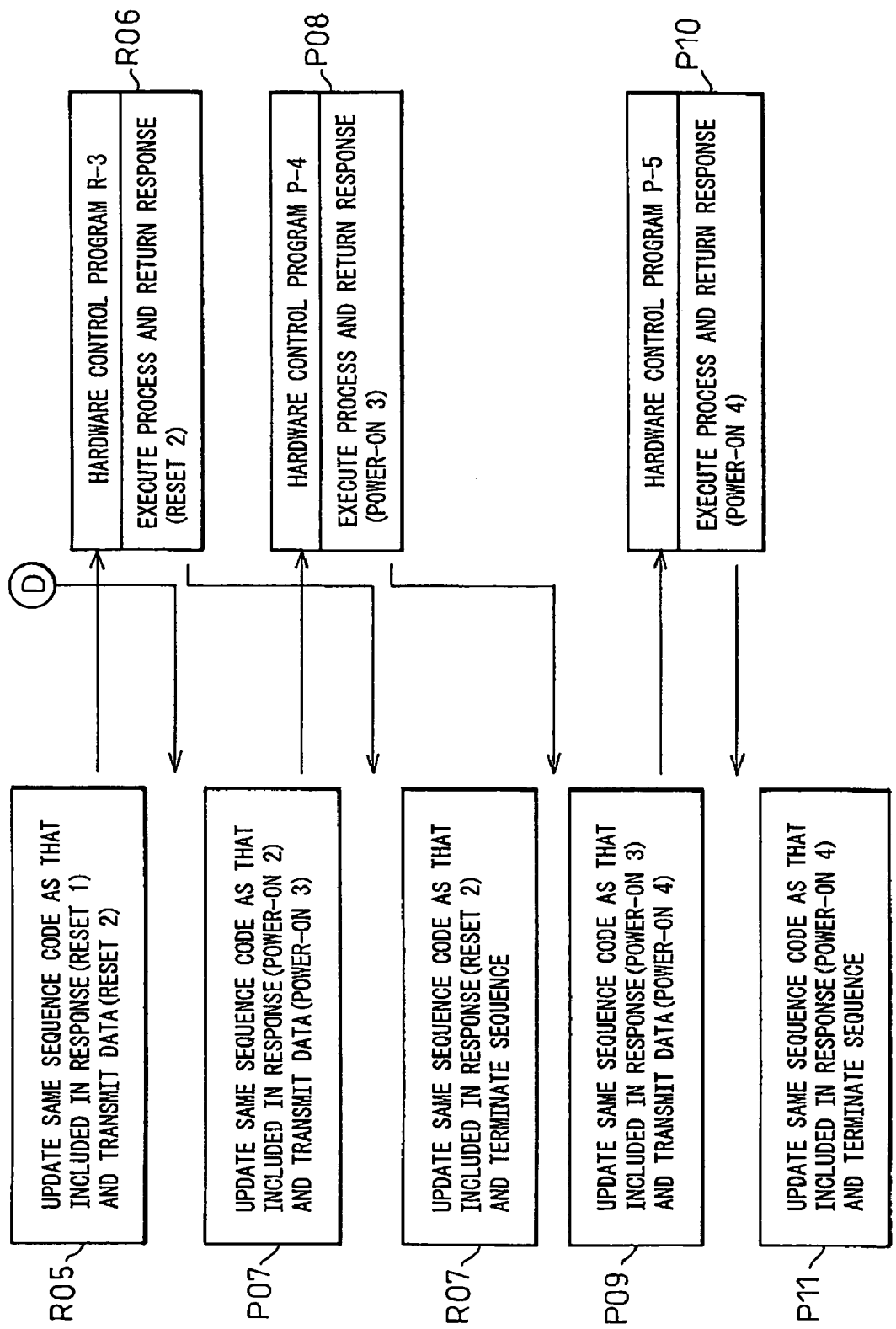

Fig.14

POWER-ON PROCESS (EXAMPLE OF CHANGE)

| PROCESS NUMBER | EXECUTION PROCESS | CONTINUATION JUDGING PROCESS | FAULT PROCESS |
|---|---|---|---|
| 0 | SYSTEM BOARD POWER-ON PROCESS | SYSTEM BOARD POWER-ON COMPLETION CHECK | POWER-OFF PROCESS SEQUENCE (PROCESS NUMBER 2) |
| 1 | SYSTEM BOARD INITIALIZATION PROCESS B | SYSTEM BOARD INITIALIZATION COMPLETION CHECK | POWER-OFF PROCESS SEQUENCE (PROCESS NUMBER 1) |
| 2 | SYSTEM BOARD INITIALIZATION PROCESS A | SYSTEM BOARD INITIALIZATION COMPLETION CHECK | POWER-OFF PROCESS SEQUENCE (PROCESS NUMBER 1) |
| 3 | DOMAIN INITIALIZATION PROCESS C | DOMAIN INITIALIZATION COMPLETION CHECK | POWER-OFF PROCESS SEQUENCE (PROCESS NUMBER 0) |
| 4 | DOMAIN INITIALIZATION PROCESS D | DOMAIN INITIALIZATION COMPLETION CHECK | POWER-OFF PROCESS SEQUENCE (PROCESS NUMBER 0) |
| 5 | PROCESS TERMINATION | NONE | NONE | ional apparatus ok...

INFORMATION PROCESSING APPARATUS AND PROCESS EXECUTION METHOD

CROSS REFERENCE TO RELATED APPLICATION

This application is a continuation application and is based upon PCT/JP2006/303634, filed on Feb. 27, 2006.

TECHNICAL FIELD

One aspect of the present invention relates to an information processing apparatus having a control facility for controlling a plurality of control targets, and to a method for executing processes for controlling a plurality of control targets.

BACKGROUND ART

Generally, in an information processing system having a server, the server is equipped with a system control facility (SCF) for controlling and supervising the entire system, and carries out prescribed processes in response to user requests for power on or power off. In the prior art, a sequence for such processes has been created as a control program to be executed by the SCF. Accordingly, when a portion of the process sequence is altered, the control program has to be created once again. However, altering a control program involves a laborious task, and there has been the problem that, when altered, the control program tends to become complicated.

Further, in the prior art control, the state of the process sequence has been judged from the system status. Accordingly, it has been difficult to manage resume processing that is necessary when an SCF is rebooted or concurrent processing that allows a plurality of process sequences to run at the same time. Further, in a system employing a dual-SCF configuration, a similar problem occurs when resuming the process sequence after switching from one SCF to the other, and it has been difficult to determine which process is to be executed when resuming.

DISCLOSURE OF THE INVENTION

Problem to be Solved by the Invention

In view of the above problem, it is an object of the present invention to provide an information processing apparatus and process execution method wherein provisions are made to execute each process using a sequence code and a sequence table so that any change made to a process sequence can be readily handled and so that a plurality of process sequences can be executed concurrently or a process when suspended due to an SCF failure or the like can be resumed from the point at which it was suspended.

Means for Solving the Problem

An information processing apparatus according to the present invention comprises: a plurality of control targets; and a control unit for performing control on at least one of the control targets, wherein the control unit includes: a plurality of sequence tables each storing a process sequence; sequence code creating means for creating a sequence code that carries control target information for specifying a control target, process type information for specifying a sequence table, and process number information for specifying one particular process in the specified process sequence; and a memory for storing the created sequence code.

As execution of each process in the process sequence is completed, the sequence code can be updated by updating the process number information. Further, the sequence code may be created to also carry a uniquely determined number.

Further, the control unit may be duplicated with a standby control unit.

A process execution method according to the present invention comprises the steps of: creating a sequence code that carries control target information for specifying a control target, process type information for specifying a sequence table in which a process sequence is stored, and process number information for specifying one particular process in the specified process sequence; storing the created sequence code in a memory; based on the sequence code, executing on the specified control target the process specified by a process number in the specified sequence table; and after execution of the process, updating the sequence code stored in the memory.

BRIEF DESCRIPTION OF THE DRAWINGS

FIG. 4 is a diagram showing a power-on process sequence table according to one embodiment of the present invention.

FIG. 5 is a diagram showing a reset process sequence table according to one embodiment of the present invention.

FIG. 6 is a diagram showing a power-off process sequence table according to one embodiment of the present invention.

FIG. 9 is a diagram showing a sequence code transition (part 1) according to one embodiment of the present invention.

FIG. 10 is a diagram showing a sequence code transition (part 2) according to one embodiment of the present invention.

FIG. 12 is a diagram (part 1) for explaining concurrent processing according to one embodiment of the present invention.

FIG. 13 is a diagram (part 2) for explaining concurrent processing according to one embodiment of the present invention.

FIG. 14 is a diagram showing one example of a sequence table when the process sequence is changed according to one embodiment of the present invention.

BEST MODE FOR CARRYING OUT THE INVENTION

Figure 1:
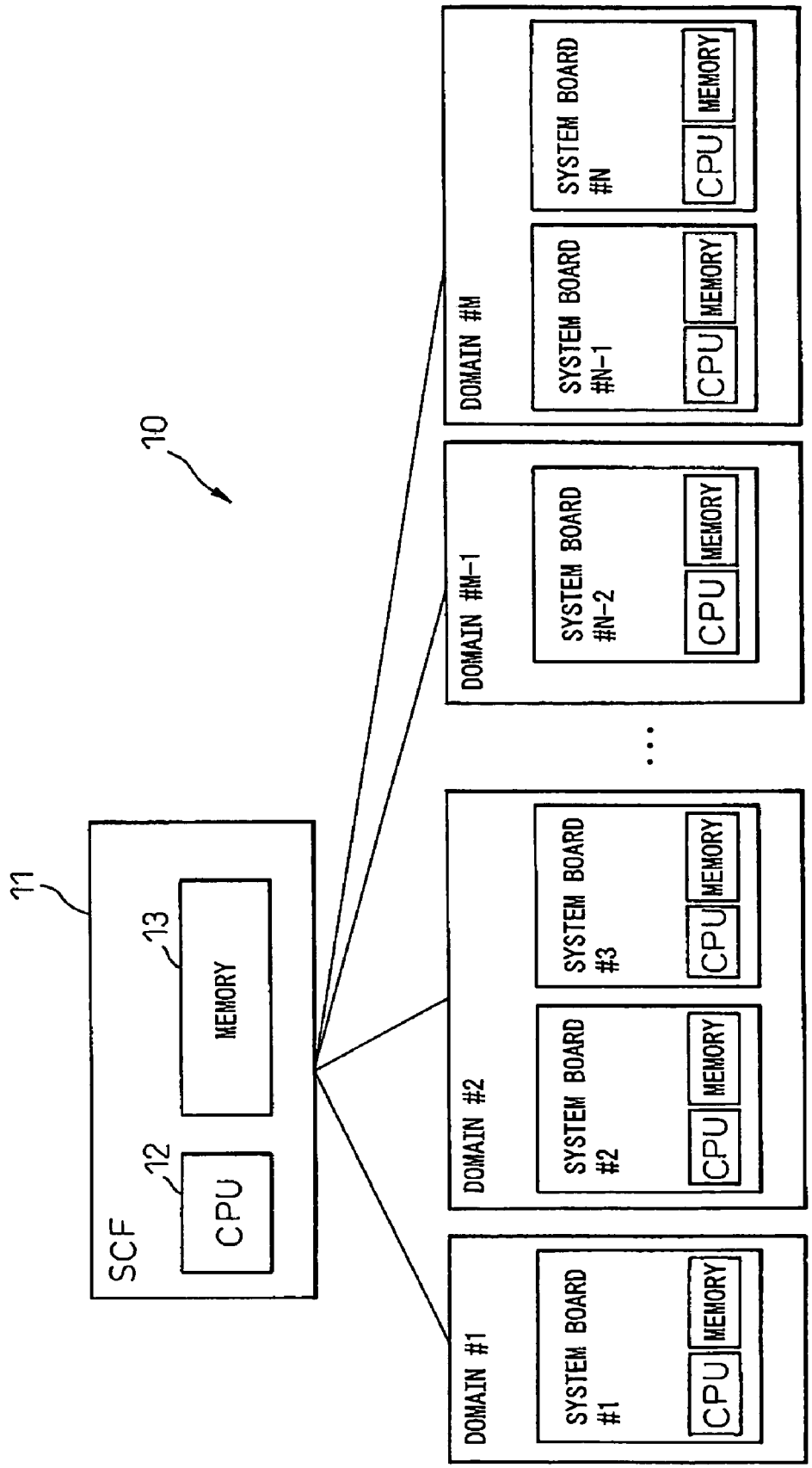
FIG. 1 is a diagram showing an overview of a single-SCF apparatus according to one embodiment of the present invention.

FIG. 1 shows an overview of a single-SCF server apparatus 10 as an apparatus according to one embodiment of the present invention. The single-SCF server apparatus 10 is equipped with a single system control facility (SCF) 11 for controlling and supervising the entire system. The SCF 11 includes a CPU 12 for performing the control and a non-volatile memory 13 for holding necessary information. The single-SCF server apparatus 10 further comprises a number, M, of system boards #1 to #M each mounted with a CPU, memory, etc. Domains #1 to #N are logical units each comprising one or more system boards and controlled by the SCF 11. In FIG. 1, domain #1 comprises one system board #1, and domain #2 comprises two system boards #2 and #3.

Figure 2:
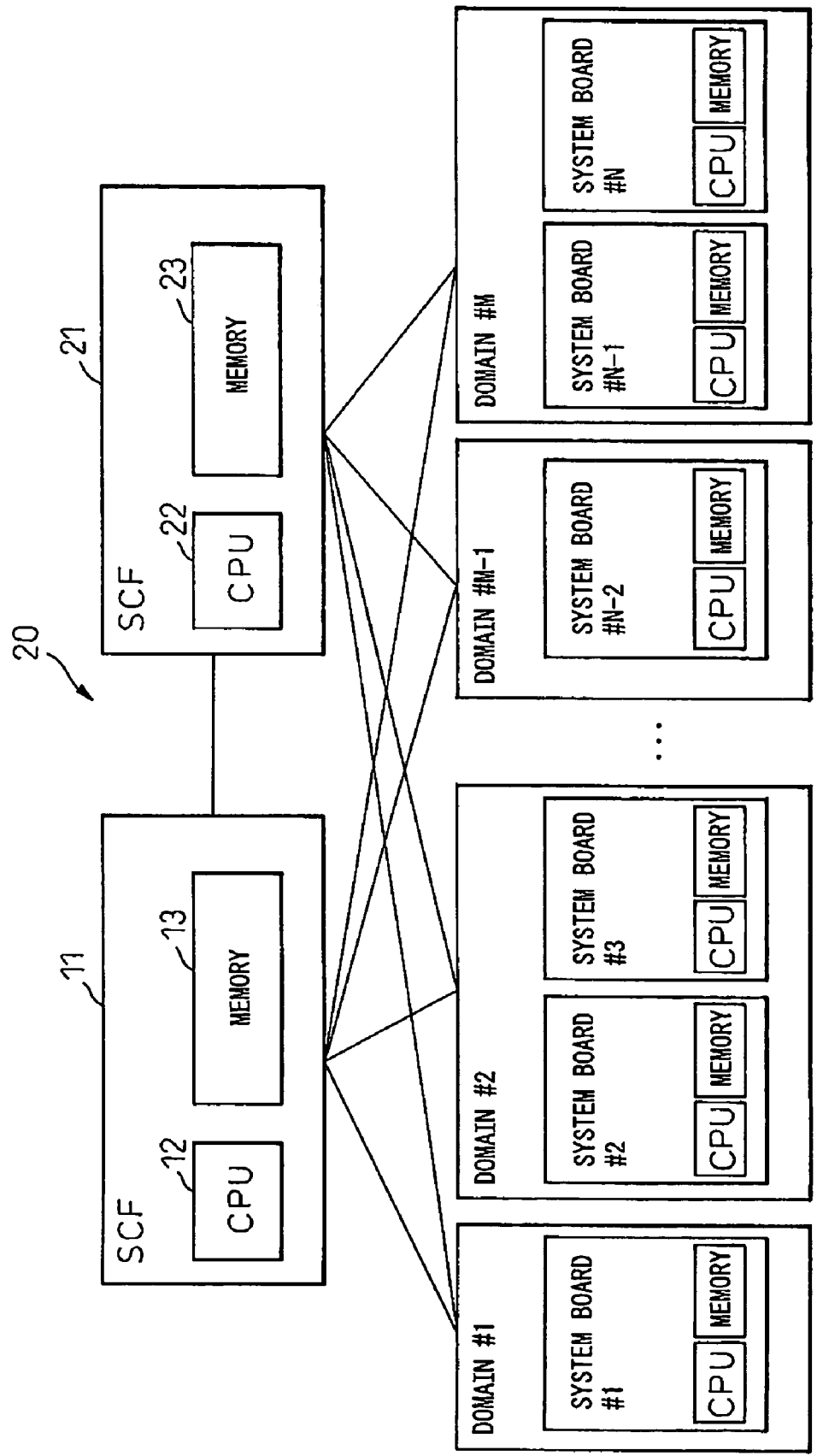
FIG. 2 is a diagram showing an overview of a dual-SCF apparatus according to another embodiment of the present invention.

FIG. 2 shows an overview of a dual-SCF server apparatus 20 according to another embodiment of the present invention. The dual-SCF server apparatus 20 differs from the single-SCF server apparatus 10 of FIG. 1 in that the apparatus 20 employs a dual-SCF configuration by duplicating the SCF 11 with an SCF 21 that has the same function and can perform the same control as the SCF 11. In other respects, the apparatus is the same as the single-SCF server apparatus. The SCF 21 includes a CPU 22 and a non-volatile memory 23, and is capable of performing the same processing as the SCF 11 on the domains #1 to #M. If the SCF 11 is failured, the SCF 21 controls the entire system instead of SCF 11.

Figure 3:
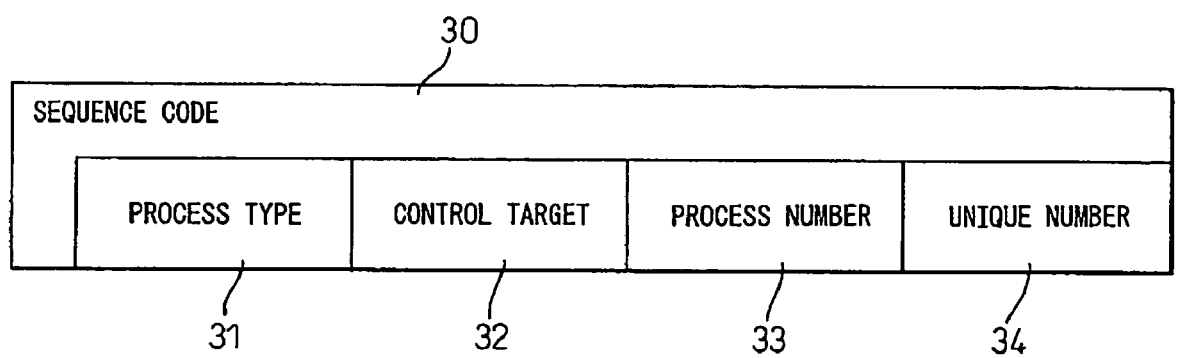
FIG. 3 is a diagram showing a sequence code structure according to one embodiment of the present invention.

In the present embodiment, a sequence code is created for each process step and stored in the memory of the SCF; at the same time, by using the thus created sequence code, a sequence table prestored in the memory is referenced, and a specific process defined in the sequence table is executed. FIG. 3 shows one example of the sequence code structure according to the present embodiment, and FIGS. 4 to 6 each show one example of the structure of the sequence table to be referenced by the sequence code.

As shown in FIG. 3, the sequence code 30 is formed from a set of fields comprising a process type 31, a control target 32, a process number 33, and a uniquely determined number 34.

The process type 31 stores information that indicates the type of the process to be executed by the designated process sequence. A numerical value is stored in the process type 31, for example, "1" for a power-on process, "2" for a reset process, "3" for a power-off process, and so on. Using the process type 31, the sequence table for executing the process requested by a user, etc. can be specified.

The control target 32 stores information that specifies the target to be controlled by the designated process sequence. If the control target is a domain, the domain number is specified as the control target 32.

The process number 32 stores the number that indicates the execution order of the process in the sequence table specified by the process type 31. The process to be executed or being executed can be identified by referring to the process number 32.

The uniquely determined number 34 is a number that is not used by any other sequence code and that can identify the designated process sequence even when a large number of process sequences are being executed at the same time. This unique number is created, for example, by incrementing a variable value that loops through sufficiently large numbers.

The following is one example of the sequence code that is first created when a power-on process request is made to the domain 2. Since the process type is the power-on, the process type 31 is set to "1", and since the control target is the domain 2, the control target 32 is set to "2". The process number 32 is set to "0" which indicates the top of the sequence table, and the unique number 34 is set to "35"; thus, the first created sequence code is (1, 2, 0, 35).

Since there is little chance that identical processes are applied almost simultaneously to the same control target, the created sequence code may be, by itself, unique even if the uniquely determined number is not appended, but the uniquely determined number is appended here to enhance reliability.

The sequence tables shown in FIGS. 4 to 6 are stored in memory, each defining in the form of a table the sequence of the processes to be executed. FIG. 4 shows the power-on process sequence table, FIG. 5 the reset process sequence table, and FIG. 6 the power-off process sequence table. Each sequence table defines the execution process that indicates the process to be executed for each process number indicating the execution order of the process, the continuation judging process that checks whether the process has been executed and determines whether the sequence can proceed to execute the next process, and the fault process that indicates the process to be executed when it is determined by the continuation judging process that the sequence cannot proceed to the next process.

Referring to the power-on process sequence table of FIG. 4, a system board power-on process is specified as the process of the power-on process number 0, system board initialization processes are specified as the execution processes of the process numbers 1 and 2, domain initialization processes are specified as the execution processes of the process numbers 3 and 4, and process termination is specified as the execution process of the process number 5. Two kinds or two stages of initialization processes are specified as the system board and domain initialization processes, but these are only examples; instead, a single process or three or more processes may be specified here.

Further, for each of the process numbers 0 to 4, the continuation judging process and the fault process are specified. In the fault process, the process number given in the power-off process sequence table shown in FIG. 6 is also specified so that an appropriate process can be called from the power-off process sequence according to each of the process numbers 0 to 4. For example, for the process number 0, it is specified that a system board power-on completion check should be executed as the continuation judging process, and that the process of the process number 2 in the power-off process sequence should be executed as the fault process. In the continuation judging process of the process number 0, after the system board power-on process is executed, it is checked whether power has actually been turned on; if the power-on has been successfully, completed the sequence can proceed to the next process number 1. However, if the power-on failed, the system board power-off process of the process number 2 in the power-off process sequence of FIG. 6 is executed, and the power-on process sequence is terminated without further continuing the process.

FIG. 5 shows the structure of the reset process sequence table. The execution process of the process number 0 is a stopping process, the execution process of each of the process numbers 1 and 2 is an initialization process, and the process of the process number 3 is a process termination. For the process numbers 1 and 2, an initialization completion check is specified as the continuation judging process, and a power-off process is specified as the fault process by referring to the process number in the power-off process sequence of FIG. 6. Two kinds or two stages of rest processes are specified as the processes of the process numbers 1 and 2, but the number of reset processes can be set to any suitable number not smaller than one.

FIG. 6 shows the structure of the power-off process sequence table. A domain operation stopping process is specified as the process of the process number 0, a system board operation stopping process is specified as the process of the process number 1, a system board power-off process is specified as the process of the process number 2, and a process termination is specified as the process of the process number 3

The power-on process sequence as one example of the process sequence of the present embodiment will be described with reference to the sequence process flowchart shown in FIGS. 7 and 8.

When a user specifies a domain that is a control target and makes a power-on request to the domain, the SCF 11 initiates the power-on process sequence to turn on power to it.

The SCF 11 creates the first sequence code for performing the power-on process for the specified domain (step S1). The sequence code here is created by setting the process type to power-on 1, the control target to domain 2, the process number to "0" indicating the top of the sequence table, and assigning as the uniquely determined number a number that is not used by the sequence code of any other process sequence being executed. If this unique number is assumed to be 35, then the sequence code is (12035).

Next, based on the process type 1 defined in the created sequence code, the corresponding power-on process sequence table (FIG. 4) is referred to, to determine that the process corresponding to the process number 0 defined in the sequence code, i.e., the power-on process, should be executed (step S2).

The sequence code is stored in the memory 13 of the SCF 11 (step S3). In the present embodiment, since the memory 13 has a memory area for each control target, the sequence code is stored in the area to store the sequence code specific to the domain 2. When a dedicated storage area is provided for each control target, the target to execute the process sequence can be easily identified. Otherwise, since the control target is identifiable by the sequence code, a dedicated storage area may not be provided for each control target. In the dual-SCF model, the contents stored in the memory 13 are copied to the memory 23 of the SCF 21.

Next, transmission data indicating the process to be executed to the hardware control program is created. The sequence code is included in the transmission data (step S4). The created transmission data is transmitted to the hardware control program (step S5).

The hardware control program processes the received data and executes the power-on (step S6). When the processing is completed, the hardware control program returns a response to the SCF. The response includes the sequence code contained in the received data (step S7).

When the response indicating the completion of the processing is received from the hardware control program (step S8), the SCF searches the memory 13 for the same sequence code as the sequence code contained in the received response (step S9), and determines whether the same sequence code is stored in the memory 13 (step S10). If the same sequence code is not found in the memory 13, it is determined that the execution instruction for that process has not been issued, and the process sequence is terminated (step S11).

The steps (steps S9 and S10) for determining the presence or absence of the sequence code by searching the memory are also useful for determining which sequence process has been executed when a plurality of processes are being executed at the same time.

If the same sequence code is found in the memory 13, it is determined that the process specified by the transmitted sequence code has been executed. Further the sequence proceeds to execute the continuation judging process to determine whether the execution of the sequence process can be continued or not (step S12). The continuation judging process is the power-on completion check as defined for the process number 0 in the sequence table shown in FIG. 4. Since the information indicating whether the power-on has been completed or not is held by the hardware control program, the power-on completion check is performed by referring to the power-on completion information held by the hardware control program.

If it is determined that the power-on has failed and power has not been turned on (step S13), the fault process is executed (step S14). The fault process is defined in the process sequence table of FIG. 4 along with its associated execution process and continuation judging process under the same process number. The fault process specified by the process number 0 in the power-on process table is executed. In the fault process of process number 0, the process of the process number 2 in the power-off process sequence should be executed as the fault process. Therefore, the process for stopping the system board operation is executed by referring to the process number 2 in the power-off process sequence of FIG. 6.

If it is determined in step S13 that power has been turned on, the execution of the sequence process can be continued, so that the process number in the sequence code is incremented and the process proceeds to the next step (step S15). When the process number in the sequence code is incremented, the sequence code changes from (12035) to (12135).

By referring to the sequence table corresponding to the process type in the updated sequence code, it is determined whether the execution process corresponding to the updated process number in the sequence code indicates a termination process (step S16). Since the process number 1 in the power-on sequence table does not indicate a process termination, the process returns to step S2 where, by referring to the sequence table, it is determined that the process corresponding to the process number 1 in the updated sequence code should be executed (step S2), after which step S3 and subsequent steps are carried out.

As described above, each time the process corresponding to the designated process number is terminated, the process number in the sequence code is incremented, and the next process defined in the sequence table is executed by repeating the steps S2 to S15.

This iterative process will be briefly described below.

In the process of the process number 1 in the power-on process sequence of the present embodiment, first the system board initialization process A is performed. Then, the continuation judging process (steps S12 and S13) is performed to check whether the initialization of the system board has been completed successfully; if the initialization failed, the system board stopping process of the process number 1 in the power-off process sequence of FIG. 6 is performed as the fault process (step S14). In the process of the process number 2 in the power-on process sequence, the system board initialization process B is performed, similarly to the process of the process number 1

In the process of the process number 3 in the power-on process sequence, first the domain board initialization process C is performed. Then, the continuation judging process (steps S12 and S13) is performed to check whether the initialization of the domain has been completed successfully; if the initialization failed, the domain stopping process of the process number 0 in the power-off process sequence of FIG. 6 is performed as the fault process (step S14). In the process of the process number 4 in the power-on process sequence, the domain initialization process D is performed, similarly to the process of the process number 3

As described above, the sequence of steps S2 to S16 is iteratively performed until reaching the process number (5) in the power-on process sequence, at which point it is determined that all the processes in the sequence table have been completed because the execution process of the process number (5) indicates the process termination (step S16); then, the sequence code is cleared from the memory 13 (step S17), and the entire sequence process is terminated.

FIGS. 9 and 10 shows how the sequence code changes during the execution of the power-on process sequence according to the present embodiment. As earlier described, when the power-on process sequence is initiated for the domain 2, first the sequence code (12035) is created which indicates the process number 0. In FIGS. 9 and 10, the sequence code for the process number X is designated "power-on X".

The created sequence code (12035) is included in the transmission data that indicates the process of the process number 0 in the power-on process sequence table, and transmitted to the hardware control program. The hardware control program executes the indicated process 0, and after execution, returns a response by including therein the power-on 0, i.e., the sequence code (12035).

When the response (power-on 0) is received, the memory is searched to retrieve the same sequence code (12035) as the sequence code (12035) included in the response (power-on 0), and the sequence code is updated by incrementing the process number and stored in memory. In other words, the sequence code is now the power-on 1 (12135).

Thereafter, the updated sequence code is transmitted to the hardware control program, and when the process is executed by the hardware control program, the hardware control program returns a response, and the sequence code is updated by incrementing the process number; this process sequence is iteratively performed. As the processes defined in the sequence table are performed sequentially in this manner, the sequence code stored in the memory changes from (12035) to (12135) to (12235) to (12335) to (12435) and finally to (12535).

When the sequence code changes to (12535), since the process number (5) indicates the sequence process termination, the sequence process is terminated, and the sequence code stored in the memory is cleared. If the sequence process is suspended for any reason, the sequence code updated and stored in the memory at the completion of each process provides information that indicates the point at which the process should be resumed after restoration.

Embodiment 2

In the single-SCF apparatus shown in FIG. 1, if a fault occurs in the SCF during the execution of the power-on process of the first embodiment and, as a result, the SCF is rebooted, the process sequence can be resumed in the following manner.

Figure 11:
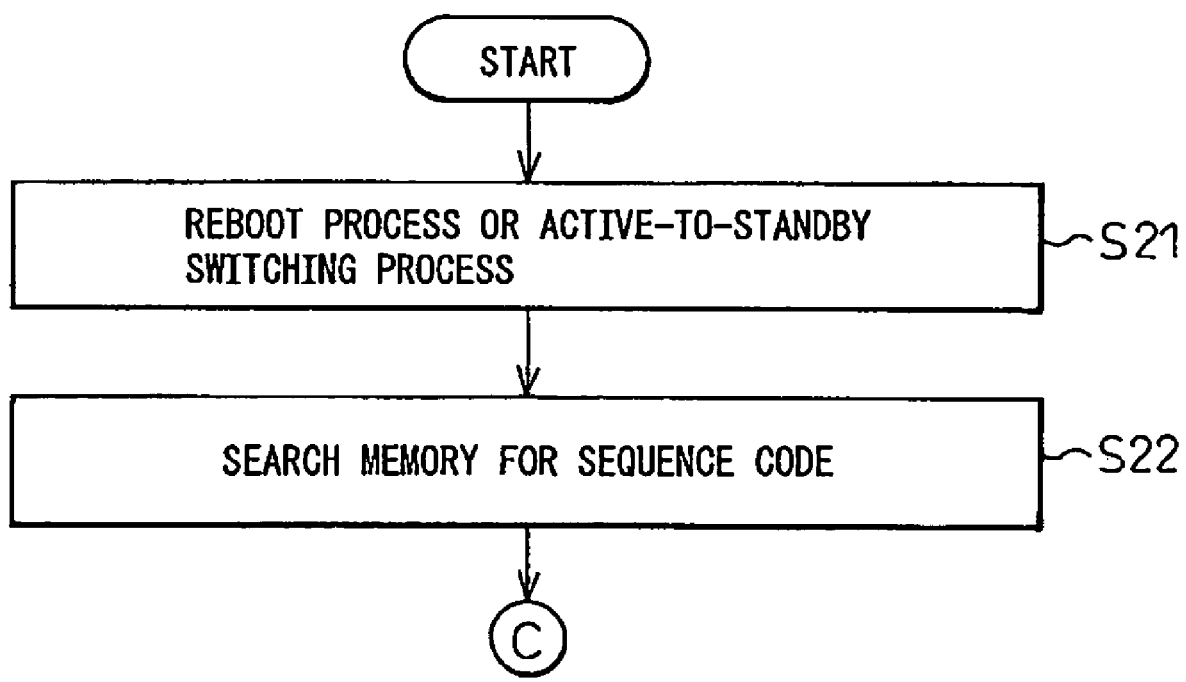
FIG. 11 is a diagram showing an operation flow in the event of a reboot or active-to-standby switching.

FIG. 11 shows a flow of an SCF reboot. In the single-SCF apparatus shown in FIG. 1, if a fault occurs in the SCF 11, the flow shown in FIG. 11 is initiated. When the reboot process of the SCF 11 is executed and completed (step S21), the memory 13 of the SCF 11 is searched for a sequence code (step S22). If the sequence code is found, it can be determined that the reboot occurred during the process specified by that sequence code. Therefore, the flow shown in FIGS. 7 and 8 should be resumed from the step S16 shown in FIG. 8. In step S16, it is checked whether the process specified by the sequence code is the process termination and, if it is not, the process specified by the sequence code is executed starting from step S2.

For example, supposing that the SCF reboot occurred at No. 6 in the sequence code transition diagram shown in FIG. 9; the sequence code (12235) of the power-on 2 is stored in the memory 13 of the SCF 11. Therefore, the process should be resumed in accordance with the sequence code retrieved from the memory 13 in step S2. According to the sequence code (12235), it can be seen that the system board initialization B identified by the process number 2 in the power-on process sequence table of FIG. 4 should be performed on the control target 2, i.e., the domain 2, in accordance with the power-on process identified by the process type 1.

Embodiment 3

In the dual-SCF apparatus shown in FIG. 2, if a fault occurs in the SCF 11 during the execution of the power-on process of the first embodiment, the SCF 11 has to be switched to the SCF 21. Since a copy of the contents of the memory 13 of the SCF 11 is stored in the memory 23 of the SCF 21, the power-on process sequence executed by the SCF 21 can be resumed starting from the process determined by the sequence code stored in the memory 23 of the SCF 21.

As shown in FIG. 11, the flow at the time of SCF switching in the dual-SCF apparatus is essentially the same as the flow at the time of a reboot in the single-SCF apparatus. When switching from the SCF 11 to the SCF 21 is completed (step S21), the memory 23 of the SCF 21 is searched for the sequence code (step S23). If the sequence code is found, it can be determined that the SCF switching occurred during the execution of the process specified by that sequence code; therefore, the flow shown in FIGS. 7 and 8 should be resumed from the step S16 shown in FIG. 8. In step S16, it is checked whether the process specified by the sequence code is the process termination, and if it is not, the process specified by the sequence code is executed starting from step S2.

Embodiment 4

Figure 7:
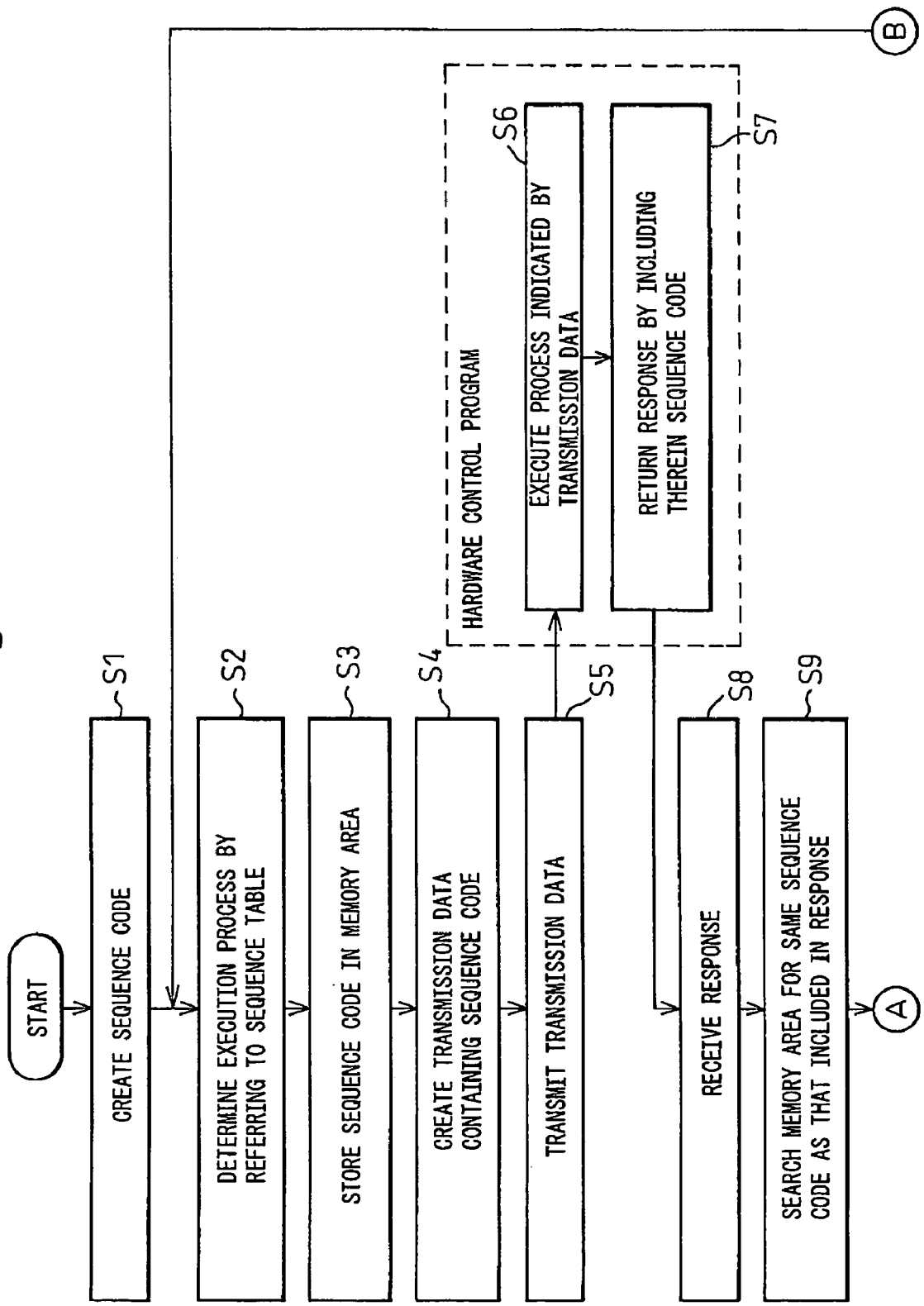
FIG. 7 is a diagram showing an operation flow (part 1) for explaining a process according to one embodiment of the present invention.
Figure 8:
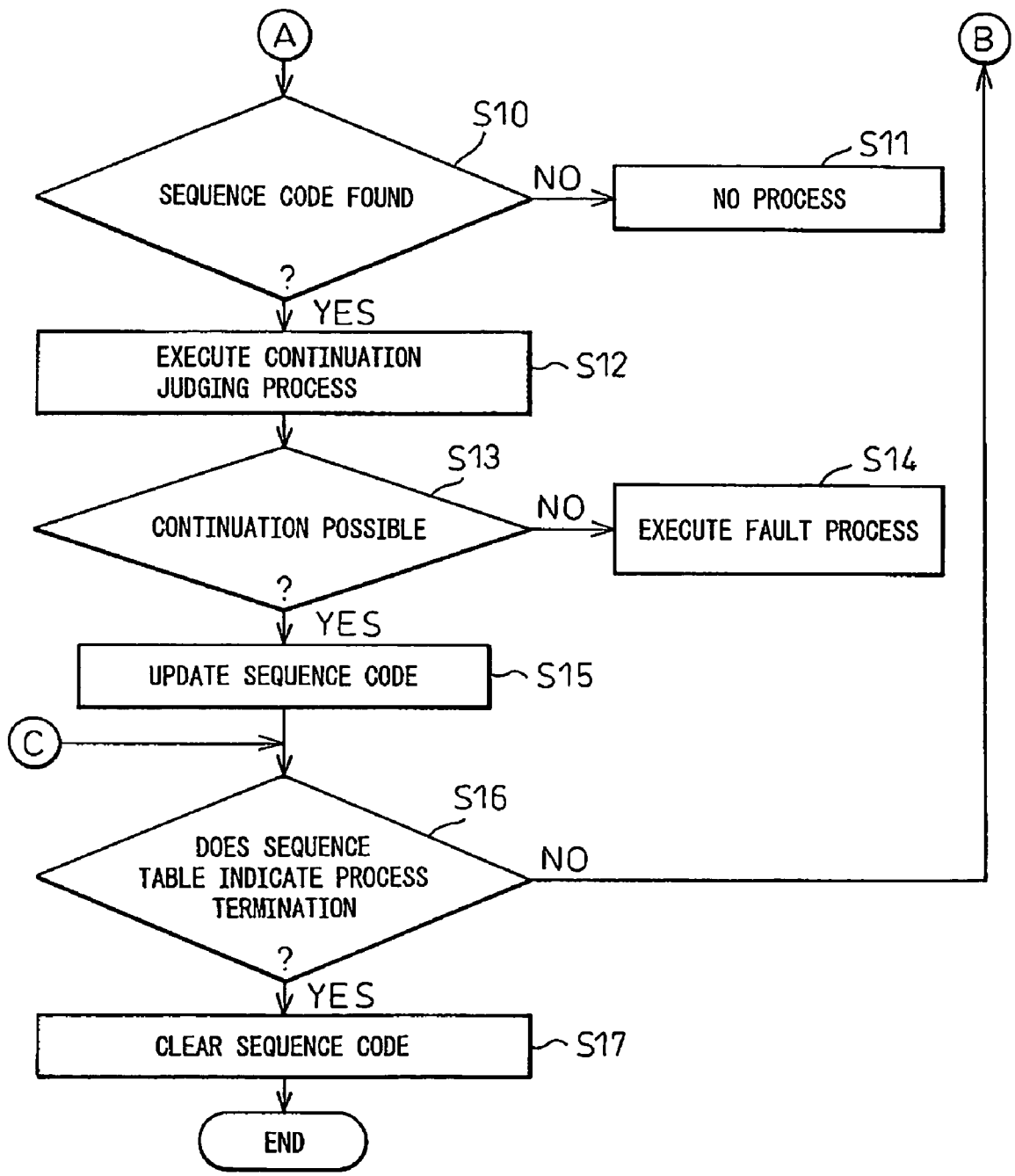
FIG. 8 is a diagram showing an operation flow (part 2) for explaining a process according to one embodiment of the present invention.

In the single-SCF apparatus of FIG. 1 or the dual-SCF apparatus of FIG. 2, when a request is made to execute different process sequences for different control targets, each process sequence is executed in accordance with the flow shown in FIGS. 7 and 8. Since the sequence codes of different process sequences take different values, these process sequences can be executed concurrently.

The concurrent execution of different process sequences will be described with reference to FIGS. 12 and 13. FIGS. 12 and 13 shows processing procedures when a power-on request is made to a given domain and a reset request is made to another domain.

When a power-on request is made to a domain, in block P01 the first sequence code for the power-on process is created and stored in the memory, after which data indicating the power-on 0 and containing the created sequence code is transmitted to the hardware control program.

Next, when a reset request is made to another domain, the reset process sequence is initiated in block R01, and the first sequence code for the reset process is created and stored in the memory, after which data indicating the reset 0 and containing the created sequence code is transmitted to the hardware control program.

In block P02, the hardware control program P-1 executes the process specified by the power-on 0, and returns a response by including therein the sequence code of the power-on 0

In block P03, when the response is received, the memory of the SCF is searched for the same sequence code, and if the same sequence code is found, the sequence code stored in the memory is updated by incrementing the process number.

Then, data directing the execution of the process (power-on 1) specified by the updated sequence code is transmitted.

On the other hand, in block R02, the hardware control program R-1 executes the process specified by the reset 0, and returns a response by including therein the sequence code of the reset 0

In block R03, when the response is received, the memory of the SCF is searched for the same sequence code and, if the same sequence code is found, the sequence code stored in the memory is updated by incrementing the process number. Then, data directing the execution of the process (power-on 1) specified by the updated sequence code is transmitted.

Thereafter, as each process is executed, the sequence control program checks the sequence code stored in the memory of the SCF, updates the sequence code, and proceeds to execute the next process. In FIGS. 8 and 9, the power-on process sequence is indicated by P01 to P10, of which the blocks performed by the sequence control program are P01, P03, P05, P07, P09, and P11. On the other hand, the reset process sequence is indicated by R01 to R07, of which the blocks performed by the reset control program are R01, R03, R05, and R07

As described above, since the sequence code is stored in the memory of the SCF, it is possible to clearly identify which process has been executed and which process is to be executed next. Accordingly, even when a request is made to execute different process sequences for different control targets, the process sequences can be executed concurrently.

The present embodiment has been described for the case where a request is made to execute different process sequences for different control targets, but when a request is made to execute a plurality of identical process sequences for different control targets, the process sequences can also be executed concurrently because the sequence codes of the respective processes are different.

Embodiment 6

When there arises a need to change the process sequence, the change can be accommodated by making a corresponding change to the sequence table. An example is shown in FIG. 14. When it is desired to interchange the order of the process of the process number 1 and the process of the process number 2 in the power-on process sequence table of FIG. 4, the sequence table of FIG. 4 need only be corrected by interchanging the order of the process number 1 and process number 2 as shown in FIG. 14. In this way, the processing procedure can be changed easier than when changing the program itself as has been the case in the prior art. Further, if it is desires to add a new process, the addition can be made easily by adding a corresponding entry and assigning a new process number to it.

As described above, in the present embodiment, since the process sequence stored in the sequence table is executed based on the sequentially updated sequence code, any change in the process sequence can be easily accommodated by just changing the sequence table accordingly.

Further, since the sequence code created to perform any given process is a code unique to that process, and the process is executed by referring to this code, different processes can be easily executed concurrently. Furthermore, this code is updated and stored as the execution of the process progresses. Since the state of progress of the process is clearly identifiable from the stored code, the process, if suspended during the execution, can be easily resumed later. It is also possible to resume the suspended process after an SCF reboot or after active-to-standby SCF switching.

According to an aspect of the information processing apparatus of the present invention, any change made to the process sequence can be accommodated by just making a corresponding change to the sequence table.

Furthermore, according to an aspect of the present invention, a plurality of processes can be executed concurrently. Moreover, according to an aspect of the present invention, the process sequence, if suspended due to the occurrence of a fault in the control unit, can be resumed from the point at which it was suspended. When the control unit is duplicated with a standby control unit, the process sequence can be transferred from one control unit to the other if switching occurs from one to the other.

What is claimed is:

1. An information processing apparatus comprising:
a plurality of control targets; and
a control unit to control at least one of the control targets, wherein the control unit includes:
a plurality of sequence tables each storing a process sequence;
a sequence code creating section to create a sequence code that carries control target information for specifying a control target, process type information for specifying a sequence table, and process number information for specifying one process in the specified process sequence; and
a memory to store the created sequence code, and
wherein the sequence code further carries a uniquely determined number.

2. The information processing apparatus as described in claim 1, wherein as execution of each process in the process sequence is completed, the sequence code is updated by updating the process number information after execution of the one process in the process sequence.

3. The information processing apparatus as described in claim 1, wherein updating of the process number information is performed by retrieving the process number information stored in the memory and updating the retrieved process number information.

4. The information processing apparatus as described in claim 1, wherein the control unit is duplicated with a standby control unit.

5. The information processing apparatus as described in claim 4, wherein the sequence code is also stored in a memory provided in the standby control unit.

6. The information processing apparatus as described in claim 1, wherein the sequence table defines, in addition to the process to be executed, a process for judging whether the execution of the sequence can be continued or not, and a process for handling a fault when the execution cannot be continued.

7. The information processing apparatus as described in claim 6, wherein the control target is a domain having at least one system board, and the control unit is a system control facility.

8. A process execution method comprising:
creating a sequence code that carries control target information to specify a control target, process type information to specify a sequence table in which a process sequence is stored, and process number information to specify one process in the specified process sequence;
storing the created sequence code in a memory;
executing on the specified control target the process specified by a process number in the specified sequence table based on the sequence code; and updating the sequence code stored in the memory after the executing,
wherein the sequence code further carries a uniquely determined number.

9. The process execution method as described in claim 8, wherein the updating of the sequence code is performed by updating the process number information.

10. The process execution method as described in claim 8, wherein the sequence table defines, in addition to the process to be executed, a process for judging whether the execution of the sequence can be continued or not, and a process for handling a fault when the execution cannot be continued.

11. The process execution method as described in claim 8, wherein the executing comprises directing the execution of the process by transmitting data containing the sequence code from a sequence control program to a hardware control program and, after executing the process by the hardware control program, returning a response containing the sequence code from the hardware control program to the sequence control program.

12. The process execution method as described in claim 8, wherein the updating comprises retrieving from the memory the same code as the sequence code contained in the response and updating the retrieved code.

13. An information processing apparatus, comprising:
a plurality of control targets; and
a control unit to control at least one of the control targets, the control unit including:
   a plurality of sequence tables each storing a different process sequence for controlling any control target;
   sequence code creating section that creates a sequence code for each processing step, the sequence code carries control target information for specifying a control target to be controlled, process type information for specifying a sequence table for controlling the control target specified by the control target information, and process number information for specifying one process of a process sequence stored in a sequence table specified by the process type information; and
   a memory for storing the created sequence code,
wherein when controlling a control device specified by the control target information stored in the memory, the control unit refers to the sequence table specified by the process type information stored in the memory, and the process specified by the process number information stored in the memory is executed.

* * * * *